(12) United States Patent
Schreiber et al.

(10) Patent No.: US 7,174,744 B2
(45) Date of Patent: Feb. 13, 2007

(54) METHOD OF IMPROVING THE BIOCIDAL EFFICACY OF DRY ICE

(75) Inventors: John E. Schreiber, League City, TX (US); James T. C. Yuan, Naperville, IL (US); Meenakshl V. S. Sundaram, Burr Ridge, IL (US); David Burgener, Elmhurst, IL (US); Yves Bourhis, Westmont, IL (US); Mike F. Smith, Danville, CA (US); Steven A. Fisher, Lyons, IL (US); Edward F. Steiner, Lombard, IL (US)

(73) Assignees: American Air Liquide, Inc., Fremont, CA (US); Air Liquide America, L.P., Houston, TX (US)

( * ) Notice: Subject to any disclaimer, the term of this patent is extended or adjusted under 35 U.S.C. 154(b) by 85 days.

(21) Appl. No.: 10/632,232

(22) Filed: Jul. 31, 2003

(65) Prior Publication Data

US 2004/0093895 A1 May 20, 2004

Related U.S. Application Data

(60) Provisional application No. 60/459,398, filed on Apr. 1, 2003, provisional application No. 60/404,635, filed on Aug. 20, 2002.

(51) Int. Cl.
*F25J 1/00* (2006.01)

(52) U.S. Cl. .............................. 62/602; 62/78; 62/604

(58) Field of Classification Search .................... 62/78, 62/602, 604, 605, 1
See application file for complete search history.

(56) References Cited

U.S. PATENT DOCUMENTS

| | | | |
|---|---|---|---|
| 1,937,832 A * | 12/1933 | McKee .................... 423/437.1 |
| 3,341,280 A | 9/1967 | Eolkin |
| 4,849,237 A | 7/1989 | Hurst |
| 4,867,918 A * | 9/1989 | Kiyonaga et al. .............. 261/76 |
| 5,011,699 A * | 4/1991 | Mitsuda et al. ............. 426/320 |
| 5,405,631 A | 4/1995 | Rosenthal |
| 5,426,948 A * | 6/1995 | Hyde, Jr. ...................... 62/604 |
| 6,167,711 B1 * | 1/2001 | Slattery et al. ................. 62/78 |
| 6,210,730 B1 | 4/2001 | Mitchell |
| 6,334,328 B1 * | 1/2002 | Brill ........................... 62/347 |
| 6,458,398 B1 | 10/2002 | Smith et al. |
| 6,506,428 B1 * | 1/2003 | Berge et al. ................... 426/66 |
| 2003/0003202 A1 * | 1/2003 | Yuan .......................... 426/320 |
| 2003/0059505 A1 * | 3/2003 | Yousef et al. ............... 426/248 |

FOREIGN PATENT DOCUMENTS

JP 48038896 6/1973

(Continued)

OTHER PUBLICATIONS

Machine translation of Japanese reference 07-102240.*

*Primary Examiner*—William C. Doerrler
(74) *Attorney, Agent, or Firm*—Elwood Lee Haynes

(57) ABSTRACT

A manufactured dry ice product containing ozone entrapped or absorbed on said dry ice. The dry ice product can be used to chill and preserve food products and provides the added benefit of ozonation of the food product to kill bacteria. Novel processes for ozonating liquid and solid $CO_2$ are provided.

3 Claims, 2 Drawing Sheets

FOREIGN PATENT DOCUMENTS

| | | |
|---|---|---|
| JP | S48-38896 | 6/1973 |
| JP | 60075267 | 4/1985 |
| JP | 07102240 | 4/1995 |
| JP | 08107925 | 4/1996 |
| JP | 11116226 | 4/1999 |
| JP | 2001213701 | 8/2001 |
| WO | WO 9319626 | 10/1993 |
| WO | WO 0207526 | 1/2002 |

* cited by examiner

METHOD OF IMPROVING THE BIOCIDAL EFFICACY OF DRY ICE

CROSS REFERENCE TO RELATED APPLICATIONS

This application claims priority to U.S. Provisional application 60/404,635, filed Aug. 20, 2002, and U.S. Provisional application 60/459,398, filed Apr. 1, 2003.

FIELD OF THE INVENTION

The present invention is directed to a novel dry ice composition useful in the preservation of food and other perishable products. The invention is also directed to novel methods of making the dry ice composition. The composition of this invention and use thereof significantly improves the quality of food products and enhances food safety.

BACKGROUND OF THE INVENTION

The protection of food from damage caused by microbes, spores, insects, and other similar sources is a major concern. Each year, economic losses of food and fiber due to damage from such sources is more than $100 billion. Currently, food items are preserved using a variety of methods, including refrigeration, fumigation with toxic chemicals, irradiation, biological control, heat exposure, and controlled atmosphere storage (a fruit industry technique that involves modifying the concentration of gases naturally present in the air).

The primary problem regarding food spoilage in public health is microbial growth. If pathogenic microorganisms are present, then growth can potentially lead to food-borne outbreaks and significant economic losses. Food safety concerns have been brought to the consumers' attention since the early part of the $20^{th}$ century and those concerns have become even stronger today. Recent outbreaks from *Salmonella* and *E. coli* have increased the focus on food safety, including from a regulatory perspective. A report issued from National Research Council (NRC) in 1988 indicated that there were approximately 9,000 human deaths a year from 81 million annual cases of food poisoning. A recent study completed by the Centers for Disease Control and Prevention (CDC) estimated that food-borne diseases cause approximately 76 million illnesses, 325,000 hospitalizations and 5,000 deaths annually in the US. Those numbers reveal the dramatic need for effective means of handling food products in order to ensure food safety.

As discussed briefly above, food manufacturers use different technologies to eliminate, retard, or prevent microbial growth, such as heating. Even though heat is very efficient in killing bacteria, it also destroys some nutrients, flavors, or textural attributes of food products.

Effective sanitation depends on the combination of product and sanitation process type, and not all of the currently available technologies can deliver an effective reduction of microorganisms and at the same time prevent product or environmental degradation. Refrigeration is an effective and popular means to slow down the growth of unwanted microbes and enzymatic reactions in foods. Therefore, the shelf life and keeping quality of refrigerated food is extended. Some common ways of chilling food include the use of mechanical refrigeration equipment, ice, and dry ice.

Dry ice is solid or frozen carbon dioxide that is frequently used as an expendable refrigerant. Dry ice converts from a solid directly to a gas in the process known as sublimation. Water ice is another traditional expendable refrigerant, but has the disadvantage of converting to water after the ice melts. Dry ice is much denser and colder than traditional ice with a heat removal capability of approximately 254 btu/lb. Dry ice at atmospheric pressure is −109.3° F. (−78.5° C.) in comparison to traditional water ice 32° F. (0° C.). Dry ice sublimes by going directly from a solid to a gas without passing through the liquid stage. The cold temperature of dry ice and the fact that it leaves no residue like water ice makes it an excellent refrigerant for the transportation of chilled or frozen products. For example, the shipments that must remain frozen during transportation can be packed with dry ice. The contents will be frozen when they reach their destination and there will be no messy liquid left over like traditional water ice.

Dry ice is generally stored in insulated containers prior to use to reduce the rate of sublimation. Losses due to ambient heat typically average 1–2%/day under ideal storage conditions. Based on storage or conditions of use the sublimation rate can be as high as 50%/day. A pound of dry ice after sublimation will convert to 8.5 cubic feet of carbon dioxide gas.

Unfortunately, while refrigeration can retard microbial growth, such treatment does not kill bacteria. Accordingly, microorganisms can still survive through refrigeration, and worse, some microorganisms can still grow and produce harmful substances during refrigerated storage. Upon fumigation or other chemical treatment, another level of health problems may be created or the quality of the treated food may deteriorate. For example, chlorine has been widely used as a sanitizer of choice since World War I. However, concerns regarding the safety of carcinogenic and toxic by-products of chlorine, such as chloramines and trihalomethanes, have been raised in recent years.

Ozone, an unstable, colorless gas with a distinct odor has been proven to work more effectively on spoilage microorganisms than a classic disinfectant such as chlorine. Due to its instability, the three oxygen molecules of ozone break apart to form one diatomic oxygen molecule and another free oxygen radical. This free oxygen radical attacks the cell wall and oxidizes it thus increasing the chance of permeability to the inner surfaces of the cell. This reaction of ozone on cell structures is irreversible; therefore the cells either become attenuated or die. Historically, ozone has been widely used for water treatment since the early 1900's. Some well-known applications include disinfection of swimming pools, spas, cooling towers, and sewage plants. Ozone is normally produced by UV radiation with wavelengths below 200 nm or by the corona discharge method that requires high electric energy.

Ozone has been used as a disinfectant/oxidant in the food industry for the past several decades. It has been well applied to bulk storage (in a "room" type of storage facility) of produce (e.g. apples) or to disinfect water (e.g. municipal water or waste water treatment). Also, processes have been developed using ozone solutions (by injecting ozone gas through water) to sanitize/disinfect food products. Some examples of using ozone for sanitizing food products can be found in U.S. Pat. No. 3,341,280 for sterilizing particulate food materials; U.S. Pat. No. 4,849,237 which utilizes ozonated water for sanitizing poultry carcasses; U.S. Pat. No. 5,011,699 which sterilizes food stuffs in a processing room with the aid of a mixture of ozone gas and carbon dioxide gas and/or nitrogen gas; U.S. Pat. No. 5,405,631 directed to sanitizing citrus fruit with ultraviolet radiation and ozone generation; U.S. Pat. No. 6,210,730 directed to a method for treating perishable meat products, including the steps of chilling the meat product, exposing the chilled meat product to a chilled gas mixture including ozone, and thereafter removing the chilled gas and exchanging that gas with a mixture containing a high oxygen fraction; and U.S. Pat. No. 6,458,398 which is directed to reducing the microbial population of food in a container by the application of both a surfactant and ozone-containing wash liquor to the food.

While ozone is highly water soluble and thus generally more effective in water, it can be used effectively in the air as well, attacking yeasts and fungi as well as bacteria. In this regard, for nearly a century, ozone has been used as a food preservation agent for a wide variety of perishable food items. Among the food items not mentioned previously and potentially preserved by ozonation include potatoes, eggs, cheeses, bananas, berries, meats, carrots, onions, and peaches. Ozone dissolved in water has also been used in food storage—including the preservation of fish in ozonated ice.

Carbon dioxide has natural properties that tend to inhibit the growth of bacteria. These properties are use in controlled atmospheric packaging for preserving food products. Carbon dioxide, however, is not as effective nor as efficient as ozone at destroying bacteria. It would be useful, therefore, to combine the cooling properties of solid dry ice with the pathogen destruction capability of ozone.

JP 071002240 describes a process to prepare a solid oxidizing agent containing ozone and chlorine to simultaneously provide the strong oxidizing property of ozone and continuous oxidizing capability of chlorine to achieve an effective means for disinfection, sanitation, sterilization, prevention of food spoilage, deodorization, etc. Several methods of preparation are provided:
1. Solid oxidizing agent formed by combining ices of ozonated/chlorinated water and dry ice ($CO_2$) and solidified.
2. Solid oxidizing agent formed by combining ices of ozonated water, ices of chlorinated water, and dry ice ($CO_2$).
3. Regarding the oxidizing agent described under 1. Oxidizing agent characterized by its powdered form.
4. Regarding the oxidizing agent described under 1. Oxidizing agent formed into various specific sizes and shapes.

JP 08107925 is similar to the above and is directed to a solid oxidizing agent comprising a mixture of ice of ozonated water and dry ice in a powdered form or other specific shape. The solid oxidizing agent is prepared by mixing powdered ice of ozonated water and powdered dry ice. The powdered mixture can then be custom made to a specific shape and size. The composition can be used for disinfection, sanitation, sterilization, water purification, and odor removal. Prevention of spoilage and odor of fresh foods is disclosed.

JP 3-217294 discloses a method of manufacturing ozonated water by absorption of ozone in water containing carbon dioxide or carbonic compounds. The objective of the invention is to increase the concentration of ozone into water in as much as high ozone concentrations in water cannot be achieved by conventional techniques which simply dissolve ozone in the water. Accordingly, in this patent, carbon dioxide gas is flushed into water to produce $CO_2$-saturated water. An ozone gas mixture is then flushed into the $CO_2$-saturated water to form ozonated ice. Similarly, sodium bicarbonate-saturated water was formed and then ozone was flushed into the carbonated water. The invention is stated as enabling the manufacturer of ozonated water and ice at higher ozone concentrations than conventional manufacturing methods. The ozone-containing composition in solid form can be used for sanitation purposes and for preserving fresh foods.

SU 1274645 by Rukavishni et al describes a method to prolong the storage life and reduce produce losses of agricultural crops. As an example, rose petals are placed for storage at a low positive temperature, in a hermetically sealed polymeric container. Before loading the petals, the container is treated with an air-ozone mixture with an ozone dose factor of 0.1 mg/1 min. Dry ice is placed in the container, at a rate of 0.9 g per kg of stored produce. The rose petals are then loaded.

JP 09249510 discloses a method of controlling the emission of ozone from silica gel having adsorbed ozone. The silica gel having adsorbed ozone is packed in a bag formed from a gas tight material and having a gas communicating hole. The bag is wrapped with dry ice so that as the dry ice sublimes, the temperature inside the bag increases and allows the desorption of the ozone gas. The ozone gas is released from the bag through the hole.

SUMMARY OF THE INVENTION

This invention provides an effective means to improve a dry ice chilling process using ozone so that in combination, maximum biocidal efficacy is delivered to ensure food safety and retain the wholesomeness of food products.

Ozone is a very strong oxidizer and many food products are very delicate substrates. When food products are treated with ozone to remove any harmful bacteria, the method of delivering the ozone to food products and regulating it at the desired level are extremely important to ensure food safety and maintain the wholesomeness of the food products. If the ozone concentration is too high, oxidization and deterioration of the food products that contact the ozone will cause significant economic losses. If the ozone concentration is too low, the ozone alone may not effectively kill unwanted bacteria.

Refrigeration using dry ice is one of the most effective processes that retard the growth of unwanted bacteria and extend the shelf life of food products. However, since refrigeration does not kill bacteria, and some bacteria or even pathogens can still grow slowly under refrigeration conditions, refrigeration alone poses certain serious problems to food safety.

This invention uses a multiple technologies approach, which has advantages over the use of a single technology. Combination of ozone and dry ice chilling results in much greater safety and quality of treated food products than would be expected using either technology alone.

In order to improve the quality and enhance the safety of food products, this invention provides an ozonated dry ice product. The combination of ozone and dry ice provides a means to kill bacteria while at the same time provides for the chilling of a food product. Many bacteria have the ability to repair themselves especially if they are given an opportunity to recover. Ozonated dry ice prevents bacteria from recovering and allows food processors to manufacture and transport a safer food product with enhanced food quality.

The dry ice composition of this invention effectively delivers ozone onto food products at a desired concentration through dry ice sublimation. Ozone gas is slowly released as the dry ice sublimes and provides a means to disinfect food products through direct food contact and ensure the significant reduction of spoilage and pathogenic microorganisms.

Any process capable of incorporating ozone into dry ice is useful to form the product of this invention. While not wishing to limit the dry ice composition of this invention to any particular process of forming same, the present invention also discloses several methods of incorporating ozone into dry ice. The exemplified processes typically incorporate the ozone into the dry ice during the dry ice manufacturing processes. Dry ice manufacturing processes are known in the art and can be readily manipulated to form the ozonated dry ice product of this invention.

DETAILED DESCRIPTION OF THE INVENTION

Figure 1:
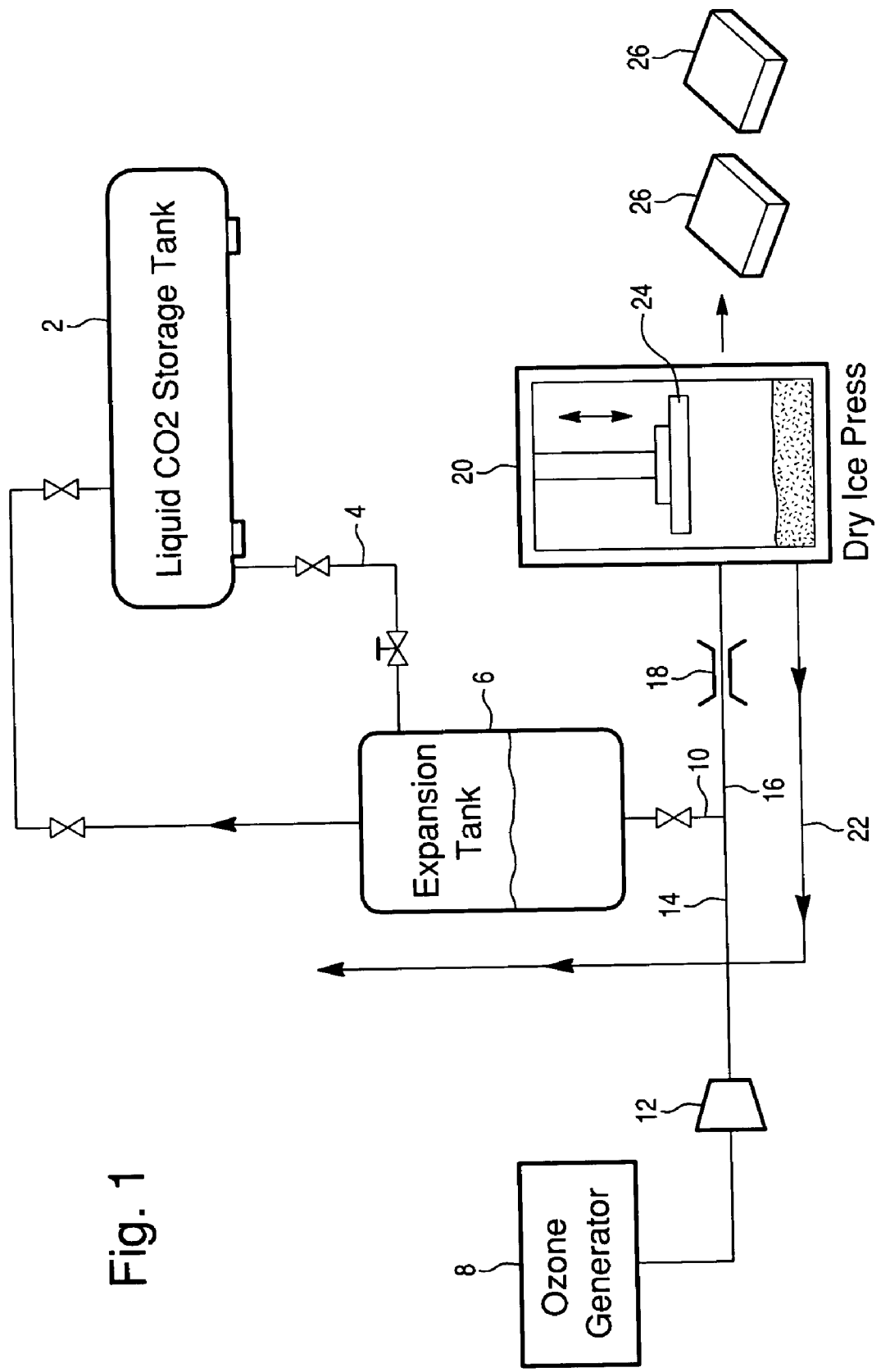
FIG. 1 is a schematic of a process of this invention for incorporating ozone into dry ice and forming pressed blocks of ozonated dry ice.

In accordance with this invention there is provided an improved dry ice product manufactured in the form of blocks, pellets, flakes, powders, and other possible forms well known in the art containing carbon dioxide and ozone. The dry ice product is essentially free of water. What is meant by "essentially free" of water is that the dry ice product, if it contains water, will comprise less than 5 wt. % water. Typically, the water content will be less than 1 wt. %. Moisture levels of up to 5,000 ppm may be helpful in maintaining the desired shape of the product. The major constituent of the product is carbon dioxide. The ozone concentration in the product can vary widely and can depend upon the end use of the product and, in particular, the product being treated and the environment surrounding the treated product. Only minute amounts of ozone are necessary for providing an antimicrobial effect. At the same time, OSHA limits the exposure levels of ozone to 0.1 ppm to 0.3 ppm in 8 hour and 15 minute shifts, respectively. Accordingly, the amounts of ozone dispersed into an area must be kept at a minimum and to a level safe for persons handling the treated product. A non-limiting level of ozone in the dry ice product can range from 0.1 ppm and above. More typically, the ozone content of the dry ice product will range from about 1 to 100 ppm. Ozone levels of 1 to 10 ppm by weight are believed to be effective for killing bacteria. Ozone present in the product is made available for various applications during carbon dioxide sublimation with the additional benefits, i.e. chilling, of using dry ice.

The product of this invention in which dry ice is combined with ozone provides an expendable form of refrigeration while simultaneously providing a method of biological treatment that does not expose humans coming in contact with the product to excessive levels of ozone. Ozone gas is generally considered to be an unstable molecule that has a short shelf life. It is known that at lower temperatures ozone is more stable and has a reduced tendency to decompose to oxygen prior to providing any biological effect. Dry ice at atmospheric pressure is at a temperature of $-109.9°$ F. The liquefaction temperature of ozone is $-168°$ F. This means that the ozone contained in the dry ice product is close to the liquefaction point, but still well into the gas phase. Accordingly, the ozone mixed with dry ice as in the product of this invention can be trapped in the structural lattices of the dry ice and/or by physical absorption onto the surface of the dry ice. The ozone in the dry ice is added for biological treatment. The most effective biocidal treatment occurs when the ozone is released in proportion with the dry ice sublimation.

The exact form of the dry ice product can vary and, accordingly, a wide variety of forms can be manufactured and used depending upon the product to be treated and the purpose of such treatment such as, for example, storage, transport, commercial sale display, etc. Thus, if the product to be treated is to be stored in large rooms, for example, blocks of dry ice ranging from 5 to 50 lbs. can be formed. Likewise, if the product to be stored, transported, or displayed for sale requires direct contact of the dry ice product, smaller manufactured shapes can be provided. Thus, for example, pellets in the range of 1/16 to 1 inch can be formed, or even powders such as snow, flakes, or chips can be formed by methods known in the art.

While the manufacturing process of the dry ice product can vary widely and it is contemplated that any process which can incorporate ozone into dry ice can be found to yield a useful product, it has been found to be particularly useful to incorporate the ozone into the carbon dioxide during the dry ice manufacturing process.

The traditional first step in making "Dry Ice" is to manufacture carbon dioxide liquid. This is done by compressing $CO_2$ gas and removing any excess heat. The $CO_2$ is typically liquefied at pressures ranging from 200–300 pounds per square inch and at a temperature of $-20°$ F. to $0°$ F. respectively. It is stored in a pressure vessel at lower than ambient temperature. The liquid pressure is then reduced below the triple point pressure of 69.9 psig by sending it through an expansion valve. This can be done in a single step or, in many cases, by reducing the liquid pressure to 100 psig at a temperature of $-50°$ F. as a first step to allow easy recovery of the flash gases. The liquid $CO_2$ is expanded inside a dry ice manufacturing press to form a mixture of dry ice solid and cold gas. The cold gas is vented or recycled and the remaining dry ice snow is then compacted to form blocks. Dry ice is typically compacted to a density of approximately 90 lb/ft 3.

The present invention facilitates the above by directly contacting compressed ozone with carbon dioxide. In comparison, existing prior art as discussed previously dwells in using indirect methods to combine ozone with dry ice after the dry ice is manufactured. Such products include substantial amounts of water ice and, accordingly, inherit the problems associated with melting.

In general, to manufacture ozonated dry ice, compressed ozone at a pressure of at least 90 psig is combined with liquid carbon dioxide at a pressure above the triple point of $CO_2$ (70 psig), allowing the ozone to fully dissolve in the liquid $CO_2$. The feed gas for ozone injection can include $O_2$, air, a mixture of $O_2$ and air or mixture of $O_2$, air, and an inert gas, e.g. $N_2$, $CO_2$, Ar, Kr, Xe, Ne.

Inert gas, if included with the ozone during contact with the $CO_2$, may comprise 10–99% total concentration of injected gas in the process. The inert gases may be mixed with ozone or added separately during the process. The temperature of the ozone treatment is maintained at ambient or below. $CO_2$ pressures ranging from 70 psig to 100 psig can be used during the mixing process. The ozone compression pressure will typically range from about 100 to 150 psig. Higher ozone pressures can also be used when available. The liquid carbon dioxide/ozone mixture is then expanded to generate dry ice, "snow", containing ozone, oxygen, and dry ice—"ozonated dry ice." This modified dry ice can then be collected or shaped such as by pressing or extrusion. This scheme can be successfully adapted to existing dry ice plants.

Methods of producing ozone are well known in the art. Ozone is generated using oxygen or air. There are two primary methods of creating ozone from air: by an ultraviolet light generator light system or by an electrical discharge system. An ultraviolet light ozone generator typically consists of multiple ultraviolet light tubes within an aluminum housing. In a multiple tube apparatus, air enters the generator cavity and is subjected to the ultraviolet light and the ultraviolet light causes a disassociation of the oxygen molecules, which exists as $O_2$, to 2 oxygen atoms. Some of these oxygen atoms attach themselves to oxygen molecules to form ozone ($O_3$). The resulting ozone and sterile air mixture comprises approximately 0.2 percent of ozone by weight/weight of air. In the preferred mode, the ozone gas is generated from oxygen or oxygen-enriched air by a corona discharge device that produces concentrations ranging between about 1% to about 15% by weight of ozone. Based on technologies available today, it is possible to generate ozone concentrations up to a maximum of 13.5% with the remainder being oxygen and a small fraction of other gases. It is possible to use higher ozone concentrations for this application if the generator technology becomes available. Higher concentrations of ozone are preferred. It is preferred to use oxygen compared to air due to the possibility of producing higher concentrations of ozone. It is industrially proven that ozone can be compressed to 150 psig using water ring compressors. It is feasible to safely compress an ozone/oxygen mixture containing 10% by weight of ozone to 70 atm pressures. Several others have tried ozone liquefication by using higher pressures without much success.

Figure 2:
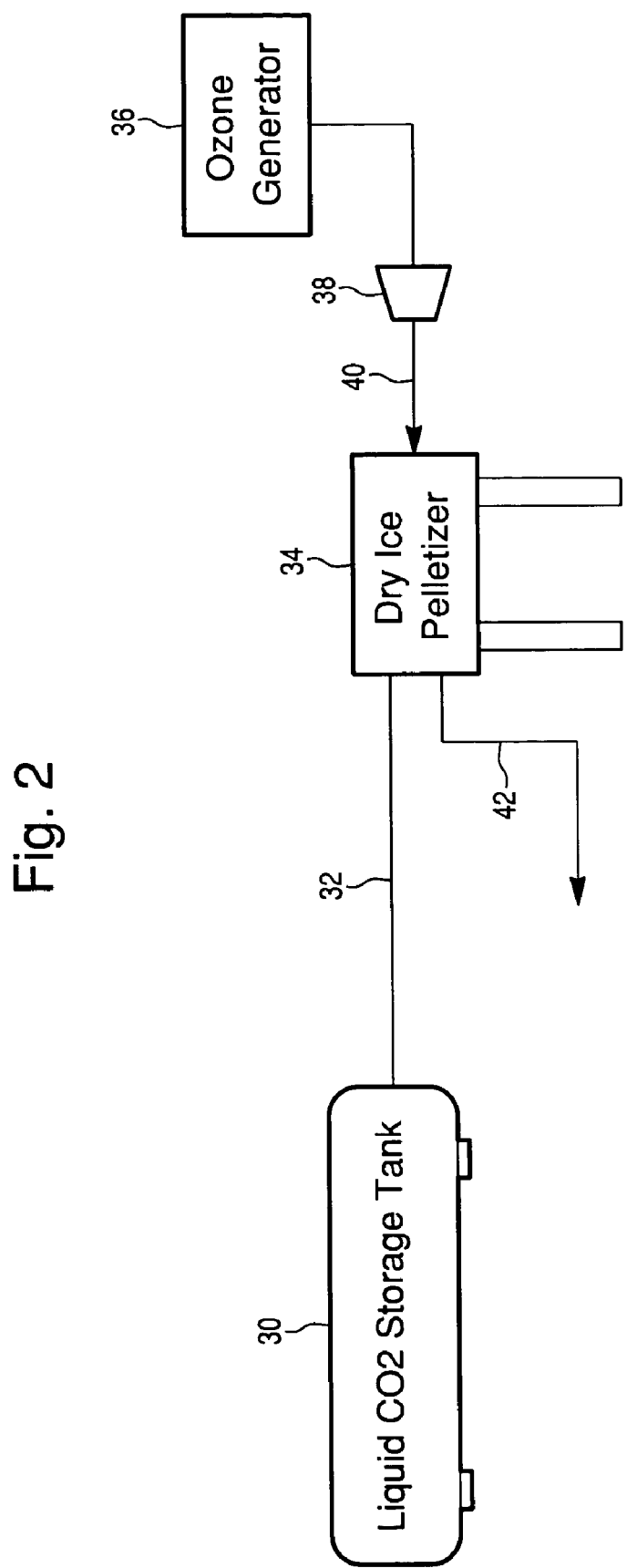
FIG. 2 is a schematic of a process of this invention for incorporating ozone into dry ice and forming extruded pellets of ozonated dry ice.

FIGS. 1 and 2 depict alternative methods of forming the ozonated dry ice product of this invention. Each figure represents a typical dry ice manufacturing process in which FIG. 1 is a process used to form blocks of dry ice, while FIG. 2 depicts a process used to form dry ice pellets. These processes can be modified to incorporate ozone into the dry ice product. First, with respect to FIG. 1, liquid carbon dioxide is stored in tank 2, typically at pressures of 200 to 300 psig. The liquid carbon dioxide from storage tank 2 is then passed via line 4 to a low-pressure expansion tank 6 wherein the liquid $CO_2$ is expanded to a pressure above the triple point of carbon dioxide (69.9 psig). Typically, the liquid $CO_2$ is expanded to pressures of from about 70 to 100 psig in expansion tank 6. What results is a mixture of gas and a dense, viscous carbon dioxide liquid. It is important that the liquid $CO_2$ is not formed into solid dry ice at this point in as much as the solid in the piping would disadvantageously reduce transport of the liquid. Ozone from an ozone generator 8 is then injected into the liquid carbon dioxide. Injection of the ozone can be done in the low-pressure expansion tank although, as shown in FIG. 1, the ozone is mixed with the liquid $CO_2$ after the liquid $CO_2$ leaves expansion tank 6 via line 10. Ozone from the ozone generator 8 is compressed to pressures of from about 100 to 150 psig in compressor 12 and then fed via line 14 to mix with the liquid $CO_2$ from line 10. The mixture of ozone and liquid $CO_2$ is passed via line 16 through an expansion orifice 18 into the dry ice press 20. Alternatively, although not shown, the mixture of ozone and liquid $CO_2$ can be passed to a separate refrigeration unit, wherein the liquid $CO_2$ is frozen into a solid containing the entrapped ozone.

As further shown in FIG. 1, the mixture of liquid $CO_2$ and ozone is allowed to expand inside the dry ice press 20. During expansion, the liquid $CO_2$ is converted to a solid form and the ozone is trapped in the structural lattices of dry ice and/or by physical absorption during dry ice formation. The major portion of the ozone will remain attached to the cold dry ice particles and only a small portion will exit dry ice press 20 with the flash gases via line 22. Once the dry ice solid is formed, the solid particles can be compressed via platen 24 in press 20 into ozonated dry ice blocks 26.

The ozone in dry ice necessary for biological treatment is slowly released as the carbon dioxide sublimes during use. Higher concentrations and pressures of ozone are preferred to achieve higher concentrations of ozone in the dry ice product. The preferred concentration of ozone can vary depending upon the use of the dry ice and the product treated. By the above method it is possible to achieve higher concentrations of ozone compared to the prior art methods which have involved a mixture of ozonated water ice and dry ice. The present method is relatively easy to implement in existing dry ice plants with minimum capital requirement.

Referring now to FIG. 2 which depicts a process used to form dry ice pellets, such process is similar to that shown in FIG. 1. With respect to FIG. 2, liquid carbon dioxide is stored in tank 30, again, typically at pressures of 200 to 300 psig. The liquid carbon dioxide from storage tank 30 is then passed via line 32 directly to a dry ice pelletizer 34. Dry ice pelletizers are well known in the art. It is believed any dry ice pelletizer is capable of use with this invention. In the pelletizer, the liquid $CO_2$ is expanded to a pressure below 70 psig. What results is a mixture of gas and carbon dioxide solid particles. Ozone from the ozone generator 34 is compressed to pressures of at least about 100 psig in compressor 38 and then fed via line 40 to mix with the $CO_2$ in the dry ice pelletizer 34. Ozone injection can be done prior to extrusion of the dry ice particles into pellets or the ozone can be mixed with the $CO_2$ pellets after extrusion.

The liquid $CO_2$ is allowed to expand inside the dry ice pelletizer 34 and is converted to a solid form. While not wanting to be bound by any theory of operation, if the ozone is added during expansion, the ozone is believed to be trapped in the structural lattices of dry ice. If the $CO_2$ is solid, either as particles or as extruded pellets during injection of the ozone, the ozone is believed to be contained in the dry ice by physical absorption. It is believed a major portion of the ozone will remain attached to the cold dry ice particles and only a small portion will exit with the flash gases from pelletizer 34 via line 42. The solid $CO_2$ particles are extruded into pellets, typically ranging from 1/16 to 1 in. As in the block dry ice, the ozone in dry ice pellets necessary for biological treatment is slowly released as the carbon dioxide sublimes during use.

Small amounts of adjuvants may be added into the dry ice manufacturing process to improve the ozone stability in dry ice. Non-limiting useful adjuvants are as follows:

a. Water (not to exceed 5 wt. % of dry ice)
   b. GRAS (generally recognized as safe) grade acidulants such as citric acid, acetic acid, lactic acid
   c. GRAS grade surfactants such as polysorbate 60/65/80
   d. GRAS grade food preservatives such as EDTA (in any forms), BHA, BHT, sodium nitrate (in any forms).
   e. GRAS gums such as carrageenan (in any forms), xanthan gum, furcelleran (in any forms), arabinogalactan
   f. Any other GRAS grade food additives such as polyethylene glycol, sucrose fatty acid esters, fatty acids (in any forms)

The ozonated dry ice product of this invention improves the biocidal efficacy of dry ice to better ensure safe food production and maintain wholesomeness of the finished products. Ozone is effectively delivered into dry ice and at a desired concentration such that during dry ice sublimation, the ozone can exert the desired biocidal effect for disinfection and/or sanitation purposes. Ozone gas is released as a process to disinfect food products through direct food contact and to ensure significant reductions of spoilage and pathogenic microorganisms. Since ozone is more stable under cold environments, the present process provides the ultimate conditions for ozone to work at maximum reactivity. Since the release of ozone from the dry ice is well regulated, food products receive ozone slowly and constantly during the entire storage thereof, and accordingly, shelf life and quality of the food product are enhanced. Moreover, carbon dioxide chills the food products efficiently, further providing benefits to food products. The carbon dioxide slows down the growth of spoilage and pathogenic microorganisms in food, allowing the food products to last longer and safer. The carbon dioxide also slows down the enzymatic reactions in food, allowing the quality of food to be extended during storage. Carbon dioxide from dry ice sublimation also penetrates into microbial cells, lowers the intracellular pH of microbial cells, and causes those microbial cells to be more sensitive to ozone. Accordingly, a synergistic effect on biocidal efficacy can be achieved by combining dry ice and ozone.

EXAMPLE

This example illustrates the injection of ozone into liquid $CO_2$. A vertical tubular reactor was provided made of SS 304 with a capacity of about 13 L. The top of this reactor included a lid containing inlet and exit ports for gaseous and liquid components. A liquid $CO_2$ supply vessel provided a source of liquid $CO_2$.

The following operating procedure was utilized to form ozonated dry ice snow. A valve on the $CO_2$ supply vessel was opened and the reactor purged with gaseous $CO_2$ from the supply vessel. The reactor was allowed to purge for about 1–2 minutes. This was done in order to allow the vessel to be purged and minimize the chances of forming a short circuit. After about 30 seconds, the reactor was again closed and the pressure adjusted to maintain 690 kPa (100 psig) in the reactor. The valve for directing gaseous $CO_2$ from the supply vessel was then closed.

The $CO_2$ liquid was then directed from the $CO_2$ supply vessel. Liquid $CO_2$ was vented from the supply vessel until solid pieces of carbon dioxide began to appear in the vapor stream. Liquid $CO_2$ was then directed from the supply vessel to the reactor and the flow adjusted to increase or decrease the flow of the liquid $CO_2$ into the reactor. The pressure in the reactor was kept at 690–827 kPa (100–120 psig). It is important that the pressure does not go below the lower limit of this range. The pressure can be reduced in the reactor if pressure exceeds 827 kPa (120 psig). It is also useful to determine the liquid level in the reactor via a dip tube. When the reactor was 66% to 75% full of liquid, liquid $CO_2$ flow to the reactor was stopped and the liquid $CO_2$ line from the supply vessel was vented to ensure that no liquid was left in the line. The line was brought back to atmospheric pressure.

An insulated container was placed underneath the reactor to capture snow. A small amount of snow was allowed to flow from the reactor bottom in order to make sure the opening was clear. The snow produced was discarded. A backpressure regulator and reactor outlet was connected to an ozone destruction unit (glass vessel containing $MnO_2$). A gaseous ozone line was connected to the inlet of the reactor. The pressure of the ozone system was maintained higher than the pressure of the reactor. The ozone gas line was purged and then the inlet ozone line to the reactor was slowly opened to adjust the flow rate of ozone into the reactor such that the flow of gas at the ozone destruction unit outlet was slow and steady. A slight pressure increase in the reactor is normal, however, the pressure in the reactor was maintained such that reactor pressure did not increase by more than about 34 kPa (5 psig). After the desired amount of ozone had been sent to the reactor or when the pressure of the ozone system approached the pressure of the reactor, the ozone inlet was closed.

The ozone-containing dry ice "snow" was directed from the bottom of the reactor into an insulated container until enough snow had been produced.

The ozone was produced from oxygen using an Ozonia® ozone generator CFS-2 (Ozonia® Ltd., Switzerland). The ozone was collected and then compressed to a maximum pressure of about 1034 kPa (150 psig).

Approximately one liter of $CO_2/O_3$ snow was collected and placed into a beaker. KI solution was added. The snow was allowed to completely sublime while the KI solution was constantly washed over the snow. The solution was titrated with 0.1N $Na_2S_2O_3$. This procedure followed the iodometric method of determining the amount of ozone present in the sample.

RESULTS

A first test run of the laboratory scale system described above produced about 4 to 5 kg of ozonated snow. The amount of liquid carbon dioxide in the reactor was about 9 L. Approximately 2 liters of compressed gas was transferred into the liquid $CO_2$. The gas contained about 6.5% (wt/wt) $O_3$ in $O_2$ with a gas pressure of about 814 kPa (118 psig). The snow that was produced during this test had an ozone concentration of about 2 ppm.

What is claimed is:

1. A process of producing an ozonated dry ice product comprising contacting a gas stream containing ozone having a pressure of at least 90 psig with dry ice so as to entrap or absorb said ozone.

2. The process of claim 1, wherein said dry ice is in the form of powder, flakes, or pellets.

3. The process of claim 2, wherein said dry ice is in the form of powder or flakes and subsequent to contact with said gas stream, said powder or flakes are extruded into pellets.

* * * * *